United States Patent [19]

Schmid et al.

[11] Patent Number: 5,438,487
[45] Date of Patent: Aug. 1, 1995

[54] LIGHT DEVICE FOR VEHICLES

[75] Inventors: Heinrich Schmid, Nuertingen; Margret S. Von Ohr, Reutlingen, both of Germany

[73] Assignee: Robert Bosch GmbH, Stuttgart, Germany

[21] Appl. No.: 136,684

[22] Filed: Oct. 14, 1993

[30] Foreign Application Priority Data

Dec. 19, 1992 [DE] Germany .................. 42 43 173.5

[51] Int. Cl.⁶ .................. B60Q 1/26; G01M 11/06
[52] U.S. Cl. .................. 362/61; 362/83.3; 362/246; 362/249; 362/282; 362/800; 33/288; 439/36
[58] Field of Search .............. 362/61, 800, 80.1, 83.3, 362/226, 246, 249, 331, 337, 280, 282; 33/288, 335, 379; 439/36, 110, 857, 682

[56] References Cited

U.S. PATENT DOCUMENTS

| | | | |
|---|---|---|---|
| 5,038,255 | 8/1991 | Nishihashi et al. | 362/61 |
| 5,055,980 | 10/1991 | Mochizuki | 33/288 |
| 5,063,482 | 11/1991 | Collot et al. | 33/379 |
| 5,103,382 | 4/1992 | Kondo et al. | 362/800 |

FOREIGN PATENT DOCUMENTS 3017405 11/1981 Germany .

*Primary Examiner*—Ira S. Lazarus
*Assistant Examiner*—Sara Sachie Raab
*Attorney, Agent, or Firm*—Michael J. Striker

[57] ABSTRACT

A light device for vehicles has a housing mountable on a vehicle part and a light adjustably received in the housing. The housing is provided with a region which is curved in an adjustment direction of the light and the light abuts against the region. At least one mounting element extends through the housing and fixes the light so that when the mounting element is released, the light is displaceable inside the housing along the curved region, and a control element is arranged outside of the housing and follows an adjusting movement of the light. The control element is provided with indicating means for indicating an orientation of an optical axis of the light.

15 Claims, 3 Drawing Sheets

LIGHT DEVICE FOR VEHICLES

BACKGROUND OF THE INVENTION

The present invention relates to a light device for vehicles.

In particular, it relates to such a light device which has a housing arranged on a vehicle part and a light adjustably arranged in the housing, wherein the housing has a region which is curved in an adjustment direction of the lights.

Light devices of the above-mentioned general type are known in the art. One such light device is disclosed for example in the German document DE 30 17 405. This light device operates as a vertically located brake light device of a motor vehicle and has a housing mounted on the inner side of the rear window of the motor vehicle and adjustably receiving a light. The region of the housing which is curved in an adjustment direction of the light abuts against the light. The light is fixable on the housing by a screw which operates as a mounting element and extends through a longitudinal opening formed as a vertical slot from the housing outwardly and is fixed there by a nut abutting against the outer side of the housing. When the nut is released, the light can be vertically moved inside the housing for adjusting the inclination of its optical axis. The screw is guided in the slot so that only an adjustment of the light in a vertical longitudinal plane is possible. Due to the adjustability of the light inside the housing, a utilization of the light device with different inclinations of the rear window of the motor vehicle is possible. This light device has, however, the disadvantage in that the particular orientation of the light located inside the housing cannot be recognized from outside the housing. In other words, it cannot be recognized whether the adjustment of its optical axis is correct.

SUMMARY OF THE INVENTION

Accordingly, it is an object of the present invention to provide a light device which avoids the disadvantages of the prior art.

In keeping with these objects and with others which will become apparent hereinafter, one feature of the present invention resides, briefly stated, in the light device of the above-mentioned general type, in which a control element which follows the adjustment movement of the light is arranged outside of the housing and provided with indicating means which indicate the orientation of the optical axis of the light.

When the light device is designed in accordance with the present invention, the control element with the indicating means permits a user to determine the orientation of the optical axis of the light from outside of the housing, so that the light can be reliably and simply adjusted.

In accordance with another feature of the present invention, the indicating means is formed as a plan surface which is located in a predetermined position when the correct orientation of the optical axis of the light is obtained. In this case the indicating device is especially simple and can be produced without high expenses.

In accordance with a further feature of the present invention, the plan surface is arranged vertically with respect to the travelling roadway in the case when the correct orientation of the optical axis of the light is obtained. When the control surface during the correct orientation of the optical axis of the light is in a vertical position, it is very simple to verify in the mounting conditions in the vehicle.

In accordance with still a further feature of the present invention, at least one mounting element is fixedly connected in the adjusting direction with the light and extends through the control element so as to entrain it during an adjustment of the light. In this construction, the control element follows the adjusting movement of the light in a simple manner.

The control element can be also formed as a water level which is arranged on the light or on the mounting element and its air bubbles together with a scale forms the indicating device. In this construction, an especially accurate adjustment of the optical axis of the light is possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
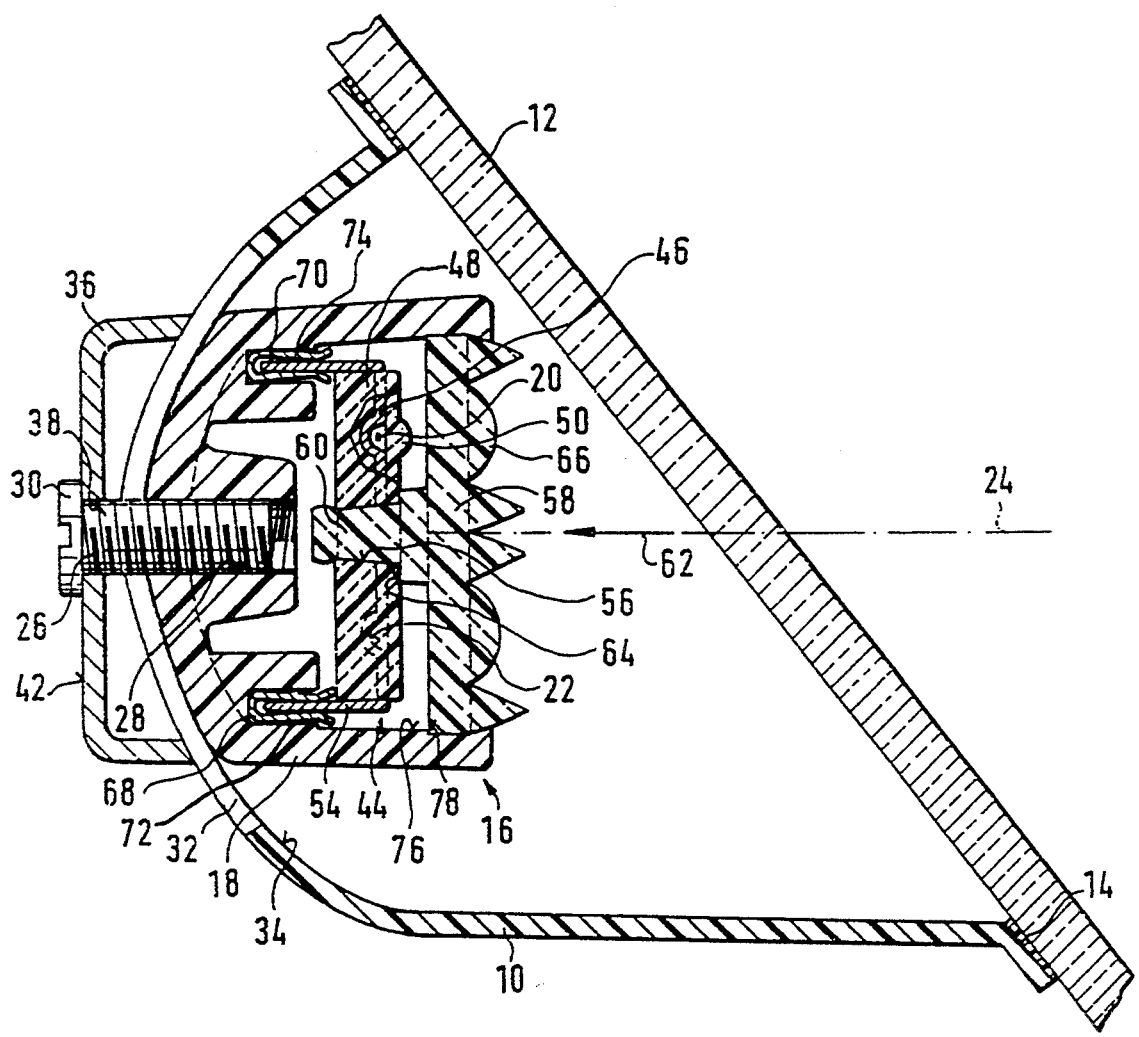
FIG. 1 is a view showing a light device on a rear window of a vehicle, in a longitudinal section.
Figure 2:
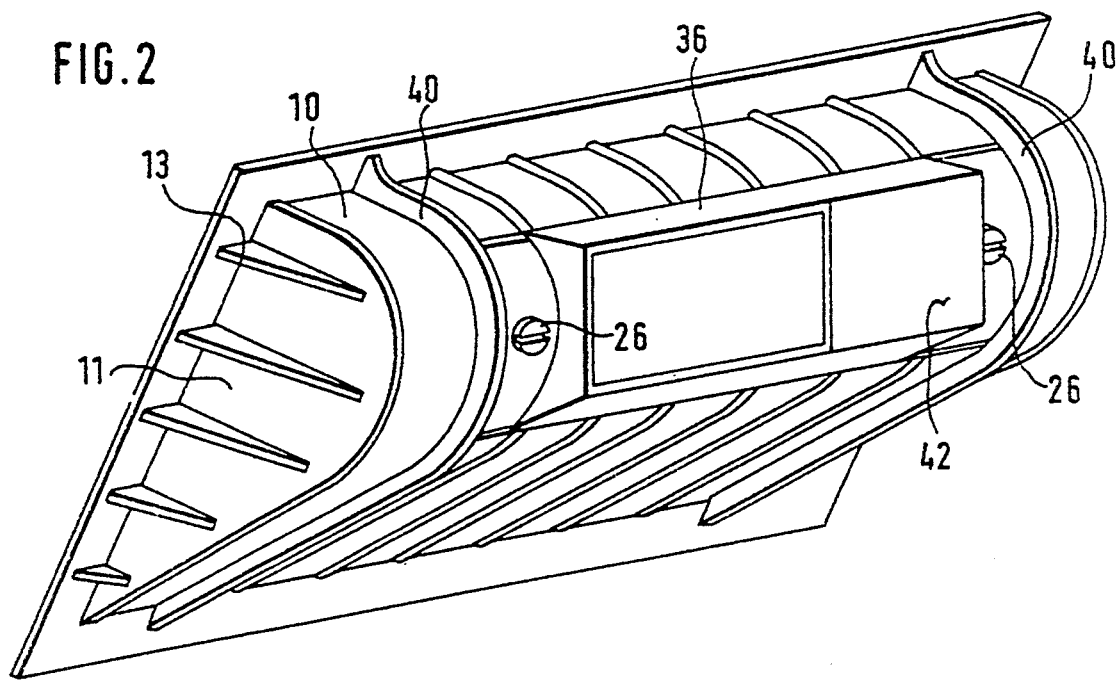
FIG. 2 is the light device of the present invention in a perspective view as seen from its rear side.

A light device shown in FIGS. 1 and 2 has a housing 10 which is composed, for example, of synthetic plastic material and mounted on an inner side of a window 12 of a motor vehicle. The mounting of the housing 10 on the window 12 can be performed, for example, by a double-side adhesive band 14 which is glued on a front edge of the housing 10. The light device in the shown embodiment serves as an additional upwardly located braking light device of the motor vehicle, so that the window 12 is the rear window of the motor vehicle. The light device can be of course used for other purposes. The window 12 is arranged vertically or inclined in any direction depending on the type of the vehicle.

The housing 10 in a vertical longitudinal section is substantially U-shaped. The upper leg of the housing 10 is shorter than the lower leg for adapting to the inclination of the window 12. The housing 10 is closed laterally by walls 11. The housing walls can be provided with reinforcing ribs 13. A light 16 is arranged in the housing 10 adjustably in a vertical direction. It has a light housing 18. One or several light sources 20 and in some cases one or several reflectors 22 are arranged in the light housing 18. The light 16 has an optical axis 24 which with the correct orientation of the light 16 is arranged horizontally and parallel to the longitudinal axis of the motor vehicle and parallel to the travelling roadway.

The light 16 is held on the housing 10 by at least one screw 26 which serves as a mounting element. The screw 26 is screwed in a threaded opening 28 in a rear wall of the light housing 18. Its head 30 extends through a vertically extending elongated opening 32 (as considered in a mounted condition of the light device on the vehicle) outwardly from the housing 10. The housing 10 is provided on its inner side with a region 34 which is curved in a vertical longitudinal section and therefore in the vertical adjusting direction of the light 16. The region 34 is an apex of the U-shape of the housing 10, on which the light housing 18 is held in abutment when the screw 26 is tensioned. The light housing 18 has a curvature which matches with the curvature of the housing 10 region 34.

A control element 36 is arranged on the outer side of the housing 10 and formed as a slider which during an adjustment of the light 16 displaces on the outer side. The control element has an opening 38 into which the screw 26 extends. The head 30 of the screw 26 can abut against the outer side of the housing 10 or the control element 36 for mounting the light 16. The control element 36 in a vertical longitudinal section is substantially U-shaped and abuts with both legs against the outer side of the housing 10. The control element 36 is somewhat smaller than the housing 10. Two vertically extending rails 40 spaced from one another can project from the outer side of the housing 10 so that the control element 36 is arranged between them. They serve as guides for the control element 36. A guide of the control element 36 can be also obtained when projections extending from it engage in vertically extending grooves in the housing 10. In the shown embodiment, a screw is provided correspondingly in the lateral edge region of the control element 36.

In the embodiment shown in FIG. 1, the control element 36 has a control surface 42 which here is a plan surface. The plan surface 42 with the correct orientation of the optical axis 24 of the light 16 extends vertically to the longitudinal axis of the vehicle and perpendicular to the roadway. Preferably a message is printed on the plan surface 42 that this plan surface must be oriented perpendicularly to the roadway, so that during mounting and adjustment of the light device, it can be taken into consideration by a person who performs such mounting and adjustment. A position of the plan surface 42 perpendicular to the roadway can be determined under the mounting condition of the light device in the vehicle in a simple manner. For this purpose, a water level can be utilized.

In order to adjust the light 16, the screws 26 must be released so that they can be vertically displaced inside the housing 10. Therefore, the light 16 moves along the curved region 34 of the housing 10, so that its orientation and thereby the inclination of its optical axis 24 in a vertical direction relative to a horizontal plane changes. With the corresponding construction of the housing 10, or in other words, when the curved region 34 extends over a large angular region, a large adjusting region of the light 16 and thereby a large angular adjusting region for its optical axis 24 can be obtained. Thereby the light device can be adapted to the window 12 with inclinations which substantially deviate from one another. The control element follows the adjusting movement of the light 16 since it is connected with the light 16 by the screws 26 extending through it.

Figure 3:
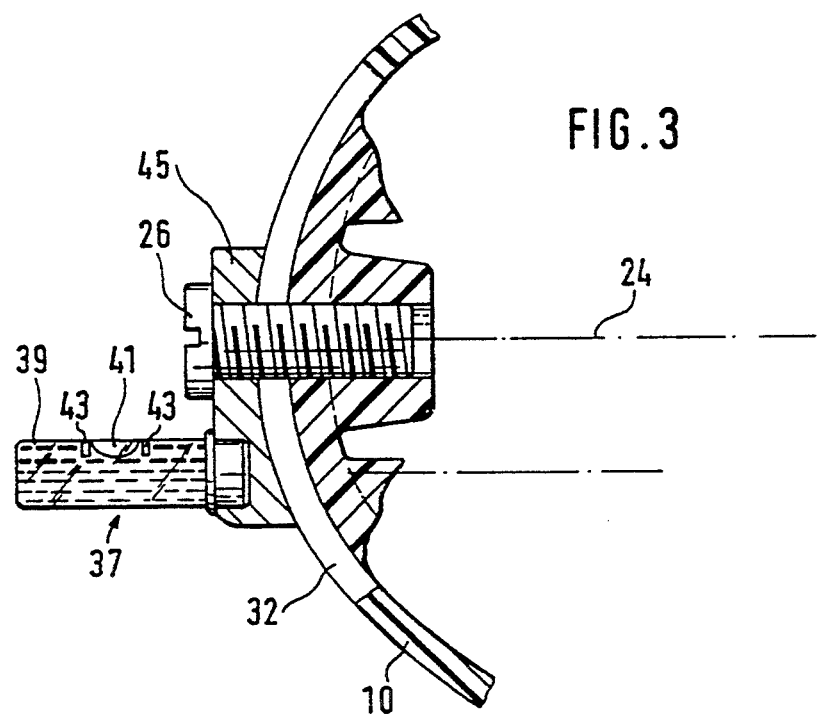
FIG. 3 is a view showing the inventive light device with a variant of a control element.

In the variant of the light device shown in FIG. 3, the control element is formed as a water level 37 which is connected, for example, with a disk-like shaped part 45 and arranged outside of the housing 10. The water level 37 has a tube 39 extending parallel to the optical axis 24 of the light 16. The water level 37 does not have to be connected with the shaped part 45. Instead, it can be connected with a part of the light housing 18 or with the screw 26 extending outside of the housing 10. A liquid with an air bubble 41 is enclosed in the tube 39 of the water level 37. A scale 43 is arranged on the tube 39, and the air bubble 41 shows the inclination of the optical axis 24 of the light 16 relative to the scale. With the correct orientation of the optical axis 24, the air bubble 41 is located in a predetermined position relative to the scale 43.

Figure 4:
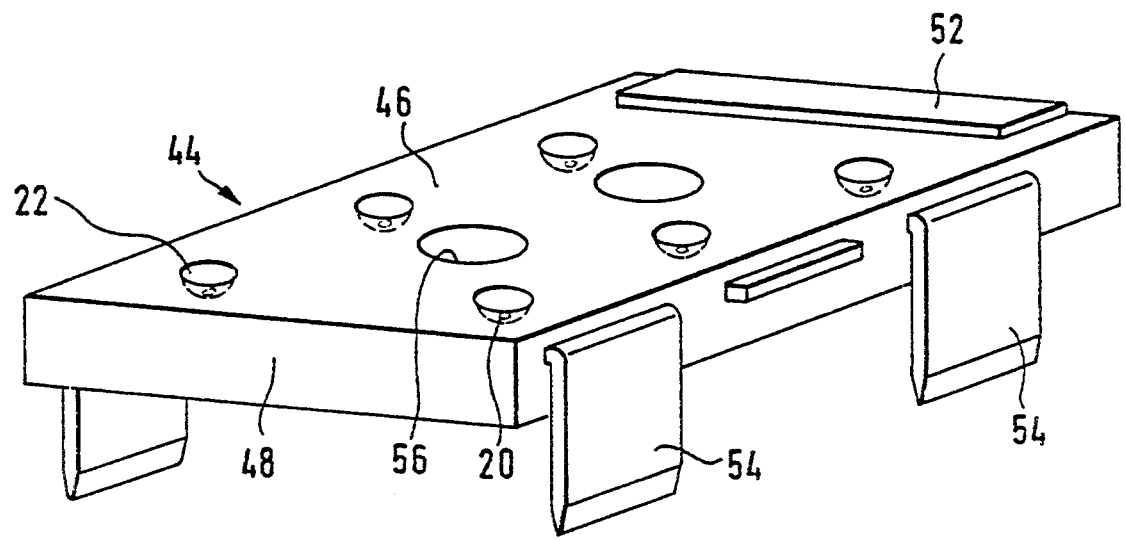
FIG. 4 is a supporting part of the light device of FIG. 1 in an enlarged, perspective view.

The light 16 in accordance with a preferable embodiment has light sources 20 formed by semi-conductor light sources, for example light diodes or laser diodes. Several separate support parts 44 shown in FIG. 4 are arranged releasably in the light housing 18 independently of one another. Several semi-conductor light sources 20 are arranged in them, for example, six light sources. The number of the support parts 44 arranged in the light 16 depends on the illumination intensity to be produced. In the shown embodiment, the support parts 44 are located near one another, so that the light 16 has a small height and a great width. The support parts 44 can be arranged in any fashion, so that they can produce surfaces of different sizes and shapes. The light 16 does not affect the visibility of the vehicle driver in view of its low height.

Reflectors 22 are formed in each support part 44, and a semi-conductor light source 20 is arranged in each reflector. The support parts 44 also have a metallic conductor track 46 for the semi-conductor light sources 20. During the manufacture of the support parts 44, first a thin metal plate is used, and then a depression for the reflectors 22 is impressed and also parts are punched out which are not needed for the electrical conductor tracks. Therefore only connection webs are retained between the conductor tracks 46 which are required for their assembly. Subsequently, at least the depressions are coated reflectingly so that the reflectors 22 are produced. The reflectors 22 can have any shape, for example, a parabolic shape or another shape. The semi-conductor light sources 20, for example, in the form of so-called light diode chips, can be inserted in the reflectors 22 and connected electrically conductively with one another and with the conductor tracks 46. A coating 48, composed of a transparent synthetic plastic mass and serving for stabilization and insulation, is injection molded around the unit composed of the conductor tracks 46, the reflectors 22 and the semi-conductor light sources 20. Therefore a substantially parallelepipedic support part 44 is obtained. The coating 48 can be colorless or can be colored in the red color required for a brake light.

The coating 48 can be provided with optical elements 50 shown in FIG. 1 and used for influencing the light radiated by the semi-conductor light sources 20. The optical elements 50 can be formed for example as lenses which in the longitudinal section, depending on the required light radiation characteristics, can be circular, parabolic, elliptical, hyperbolic or of any other shape. Subsequently, the connection webs between the conductor tracks 46 are removed during the manufacture of the support part 44, and this can be done, for example, by a laser beam. A resistance conductor track 52 can be arranged on the outer surface of the support part 44 and connected with semi-conductor light sources 20 to serve as a pre-resistance for the semi-conductor light sources 20 when the available voltage is too high for a safe operation of the semi-conductor light sources 20.

This resistance conductor track 52 can be adjusted by a laser beam to the required dimensions. Connection elements 54 extend from the conductor tracks 46 outwardly from the support parts 44 and are formed as plug stems.

Two openings 56 are formed for example in the support part 44 as receptacles for a light plate or disk 58 composed of a transparent synthetic plastic. The light plate 58 can be colorless or can be colored. Two legs 60 extend from the light plate 58 toward the support part 44 and through the openings 56 in the support part. The openings 56 and the legs 60 are conically narrow in the mounting direction 62 of the light plate 58. A projection 64 is formed on the legs 60 by a cross-section reduction, and the light plate 58 in its end position of the support part 44 comes to abutment against the projection 54. In this end position the ends of the legs 60 extending through the openings 56 are plastically deformed and upset by heating and pressure action, so that the light disk 58 is held on the support part 44. The opening 56 in the support part 44 and the legs 60 on the light plate 58 can be formed differently with respect to their position and shape, since the light plate 58 with the support part 44 can be connected only in one position and the correct arrangement of the light plate 58 is guaranteed. The light disk 58 is provided with optical elements 66 for influencing, or in other words, deviating and/or dissipating the light radiated by the semi-conductor light sources 20. These optical elements 66 can be formed, for example as fresnel lenses and arranged on the light plate 58 on its side facing the support part 44 or on its side facing away from the support part. In addition, the light plate 58 at its side opposite to the optical elements 66 can be provided with further optical elements formed as toroidal dissipating elements. Such dissipating elements have different curvatures in different longitudinal sections and thereby differently intensely deviate the light passing through them in horizontal and vertical directions. The connection of the light plate 58 is performed before the insertion of the support part 44 in the light housing 18, so that these two parts are inserted in the light housing 18 as a unit.

Contact elements 68 are arranged in the light housing 18 and connected with a not-shown voltage source, for example, the battery of the motor vehicle. The contact elements 68 in the embodiment shown in FIG. 3 are formed as busbars which are inserted in groove-like depressions 70 in the light housing 18 and held there by hooks or claws 72 projecting from the busbars. Two busbars 68 are provided and arranged so that one busbar is located in an upper region and another busbar is located in a lower region of the light housing 18. The busbars 68 in a longitudinal section of the light 16 are U-shaped. Their legs 74 extend to an opening 76 of the light housing 18 through which the support parts 44 are inserted. The legs 74 are elastically expandable and their end regions facing the openings 76 are bent outwardly.

The support parts 44 are inserted through the openings 76 into the light housing 18. Their connection elements 54 are inserted between the legs 74 of the busbars 68 and therefore elastically turned from one another, so that the connection elements 54 are clamped between them. The insertion of the connection elements 54 between the legs 74 is facilitated by outwardly bent ends. An end position of the support parts 44 can be fixed in different ways, for example, in that the light plate 58 comes to abutment against a projection 78 in the light housing 18. The light disk 58 extends laterally somewhat over the support part 44 and outwardly from it. The end position can be fixed, however, by an abutment of the connection elements 54 against the bottom of the busbars 68. The connection elements 54 extending in the busbars 68 can simultaneously hold the support parts 44 in the light housing 18. Therefore, no additional mounting elements are required, while it is to be understood that such elements can be provided when needed.

It will be understood that each of the elements described above, or two or more together, may also find a useful application in other types of constructions differing from the types described above.

While the invention has been illustrated and described as embodied in a light device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A light device for vehicles, comprising a housing mountable on a vehicle part, said housing being provided with a region which is curved; a light received in said housing and abutting against said region; at least one mounting element extending through said housing and fixing said light to said housing so that when said mounting element is released, said light is displaceable inside said housing along said curved region; and a control element arranged outside of said housing and coupled with said light for following an adjusting movement of said light, said control element being provided with indicating means for indicating an orientation of an optical axis of said light, said at least one mounting element being fixedly connected with said light in an adjusting direction, extending through said control element and entraining said control element during an adjustment of said light.

2. A light device as defined in claim 1, wherein said housing has a longitudinally extending opening, said mounting element extending through said opening of said housing.

3. A light device as defined in claim 1, wherein said plan surface is located vertically with respect to a roadway with a correct orientation of said optical axis of said light.

4. A light device as defined in claim 1, wherein said control element is formed as a water level which is arranged on said light and has a light bubble with a scale forming together said indicating means.

5. A light device as defined in claim 1; and further comprising means for mounting said housing on a window pane of the vehicle.

6. A light device for vehicles, comprising a housing mountable on a vehicle part, said housing being provided with a region which is curved; a light received in said housing and abutting against said curved region; at least one mounting element extending through said housing and fixing said light to said housing so that when said mounting element is released, said light is displaceable inside said housing along said curved region; a control element arranged outside of said housing and coupled with said light for following an adjusting movement of said light, said control element being provided with indicating means for indicating an orientation of an optical axis of said light, said light having a plurality of semi-conductor light sources; a light housing; and a plurality of support parts each provided with a portion of all said semi-conductor light sources of said light and insertable in said light housing independently of one another.

7. A light device as defined in claim 6; and further comprising electrical contact elements arranged in said light housing and connection elements provided on said support parts and abutting against said contact elements during insertion of said support parts in said light housing.

8. A light device as defined in claim 7, wherein said electrical contact elements are formed as busbars which are U-shaped in longitudinal sections through said light housing, said busbars having legs which extend against an insertion direction of said support part and are elastically expandable, said connection elements extending outwardly beyond said support parts and between said legs with elastic expansion of said legs.

9. A light device as defined in claim 8, wherein said connection elements are inserted in said busbars, said support parts being held in said light housing by said connection elements inserted in said busbar.

10. A light device as defined in claim 6, wherein each of said support parts has a receptacle; and further comprising transparent light plates each received in said receptacle and located forwardly of said semi-conductor light sources.

11. A light device as defined in claim 10, wherein said light plate is provided with optical elements for influencing the light radiated by said semi-conductor light sources.

12. A light device as defined in claim 6; and further comprising an electrical conductor provided for said semi-conductor light sources, said semi-conductor light sources and said electrical conductor of each of said support parts being surrounded by an injection molded joint coating of a transparent synthetic plastic material.

13. A light device as defined in claim 12, wherein said coating is provided with optical elements for influencing a light radiated by said semi-conductor light sources.

14. A light device as defined in claim 6; and further comprising a resistance conductor track arranged on each of said support parts and serving as a pre-resistance for said semi-conductor light sources.

15. A light device as defined in claim 1, wherein said control element is formed as a water level which is arranged on said mounting element and has a light bubble with a scale forming together said indicating means.

* * * * *